W. GROSHANS.
Device for the Manufacture of Fifth-Wheels for Vehicles.
No. 217,870.                Patented July 29, 1879.
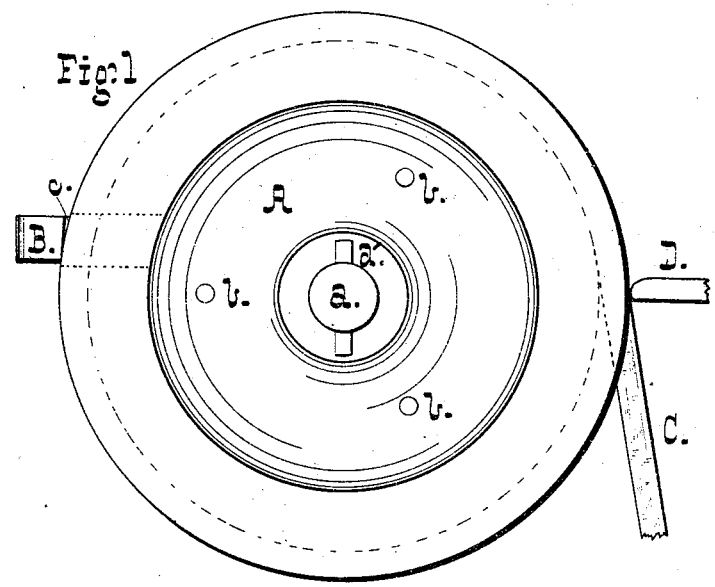
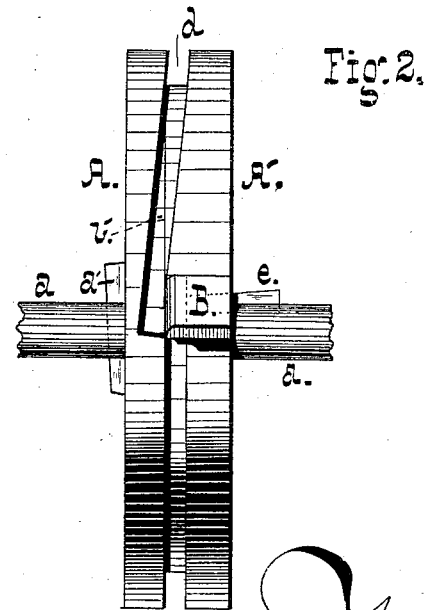

UNITED STATES PATENT OFFICE

WILLIAM GROSHANS, OF BALTIMORE, MARYLAND.

IMPROVEMENT IN DEVICES FOR THE MANUFACTURE OF FIFTH-WHEELS FOR VEHICLES.

Specification forming part of Letters Patent No. 217,870, dated July 29, 1879; application filed May 13, 1879.

*To all whom it may concern:*

Be it known that I, WILLIAM GROSHANS, of Baltimore city, State of Maryland, have invented certain new and useful Improvements in Devices for the Manufacture of Fifth-Wheels for Vehicles; and I hereby declare the same to be fully, clearly, and exactly described as follows, reference being had to the accompanying drawings, in which—

Figure 1 is a side elevation, and Fig. 2 a front view, of the device employed by me.

My present invention relates to the manufacture of what are known as the "fifth-wheels" of vehicles, and it has for its object to provide a means for bending the same from a bar of iron in the cold state, and thereby produce a superior article at less expenditure of time, trouble, and money than were heretofore involved in the ordinary method of manufacture.

Fifth-wheels consist, essentially, of an iron ring, the thickness of which is generally about one-fourth its breadth. To bend a flat bar of, say, one-half inch by two inches in cross-section into a circle of from twelve to thirty inches in diameter is the problem. This has heretofore been accomplished by heating the bar and hammering it about a mandrel, the ends being finally lapped and welded. A subsequent heating and careful hammering, to flatten the ring and bring all its parts into the same plane, was necessary, and was an operation requiring great care and nicety of manipulation. All this heating and hammering, except that necessary to weld the joint, is obviated by my method, and the resulting article is better in every respect than one made as above described.

In the accompanying drawings, A A' are a pair of disks, mounted on a shaft, $a$, upon which the disk A is held by a key, $a'$, against the face of the disk A'. Upon removing the key the disk A may be slid upon the shaft away from the other disk, which is securely held by a key, $e$. Dowel-pins $b\ b$ hold the disks in proper relative position. The face of the disk A' is cut away at $d$ at the circumference, for about an arc of three hundred degrees, to a depth equal to the thickness of the proposed fifth-wheel, and to a distance from the circumference equal to its width. The groove $d$ thus formed is continued for about seventy degrees, (say ten degrees past its inception,) with a gradual lateral inclination, until at its end it is wholly in the disk A.

B is a steel lug rigidly secured to the disk A', and overlapping the beginning of the groove, its inner face being tangent to the circumference, as shown at $c$, Fig. 1, the object being to furnish a tapering opening for the bar. The disks are divided on the line $b'$, Fig. 2, in which is shown the construction of the ends of the groove. D is an adjustable bar, adapted to be brought nearly in contact with the circumference of the disks, to hold the iron to the groove.

In operation, the end of a bar of wrought-iron, C, is inserted under the lug B, and the disks are caused to revolve, the bar being of a size to properly fill the groove, and of a length to make the ring, leaving a short lap for welding. The bar is forced into the groove by the bar D, and is bent, of course, into a true circle. When the bending is complete the key $a'$ is removed, the disk A is slid away from the other one, and the fifth-wheel is removed, and its lapped ends are welded in the usual way.

The disks A A' are preferably made of cast-iron, the edges of the groove opposite the point lettered $b'$, and thence to the open end, being faced with steel.

What I claim is—

1. In a machine for bending fifth-wheels, a pair of separable disks having an intermediate overlapping groove, substantially as set forth.

2. In a machine for bending fifth-wheels, a pair of separable disks mounted on the same shaft and having an intermediate overlapping groove, one of the said disks being provided with a lug for securing the end of the bar to be bent, as set forth.

WM. GROSHANS.

Witnesses:
R. D. WILLIAMS,
J. C. GITTINGER.